March 6, 1928.
M. SMITHEY
LUBRICATION INDICATOR
Filed Dec. 26, 1923
1,661,312
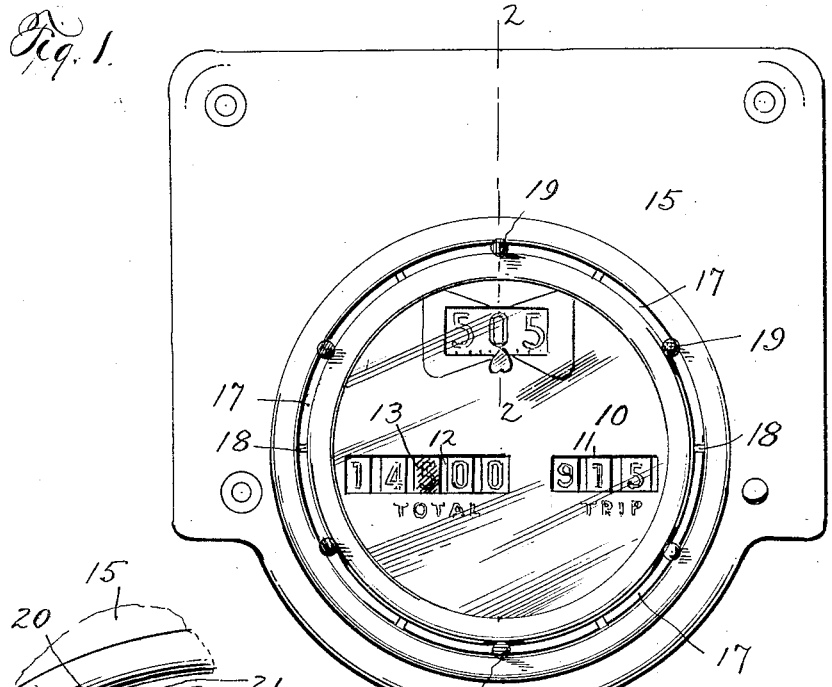
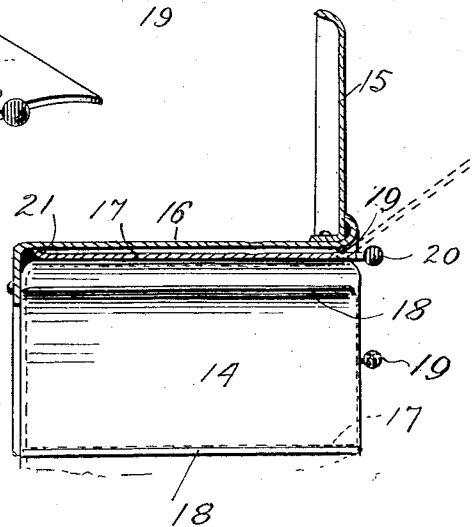
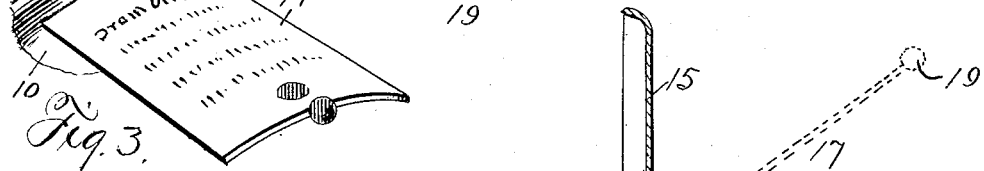
Inventor
Marvin Smithey
By Chas. J. Williamson
Attorney Patented Mar. 6, 1928.

1,661,312

UNITED STATES PATENT OFFICE.

MARVIN SMITHEY, OF LAWRENCEVILLE, VIRGINIA.

LUBRICATION INDICATOR.

Application filed December 26, 1923. Serial No. 682,703.

My invention relates to devices operated by or associated with the well known speedometer periodically warning or giving notice to the driver of a motor vehicle of the necessity for attending to some requirement of the car at the expiration of certain mileages, and in particular my invention has to do with devices of such kind in which the signals or warnings are distinctive marks, such as different colors, upon the dials or number wheels of the total mileage odometer. When a particular color or other marking is exhibited by a dial wheel the motorist knows that something should be done to or for the car but the color or other marking does not in itself give that information but reference must be made to a chart which has the corresponding markings or coloring to those on the dials with a verbal explanation of what must be done when a particular color or marking is exhibited at the display opening of the odometer. The small area of the dial wheels precludes anything but the color or other distinctive mark thereon. The object of my invention is to provide the verbal explanatory matter in such a way that it will be instantly accessible, require a minimum of space with a maximum of information, be unobtrusive in appearance or constitute a matter of decoration and yet be supported by the speedometer. My invention consists in whatever is described by or is included within the terms or scope of the appended claims.

In the annexed drawings:

Fig 1 is a face view of a speedometer embodying my invention;

Fig. 2 is a detail view in section on the line 2—2 of Fig. 1;

Fig. 3 is a perspective view of one of the information bearing segments or tablets.

My invention is embodied in a speedometer in which the signals or warnings applied to the dial wheels are spots of color. Ordinarily five different colors are used and associated with each color is textual matter explaining what must be done when the color appears and hence there must be five different items of textual matter, which may comprise a half dozen or more printed lines each two or more inches long. It is obviously impossible to affix all this matter upon the face of the instrument and a printed chart separate therefrom is ordinarily a sheet of such size as to require folding for placing in the pocket or elsewhere when not in use. By my invention I employ a plurality of segment form tablets, one for each signal and its explanatory text which are mounted in an annular space of about the diameter of the usual cylindrical shell or casing of the speedometer, the entire annular space being if desired equally divided among the tables which thus extend in a complete annular series concentric with the speedometer and around the same. Each of these tablets is slidable from within the space forward until it is sufficiently withdrawn to permit it to be swung or otherwise moved to a position to expose the reading matter thereon and to permit it to be returned into such space.

Referring in detail to what is shown in the drawings the speedometer illustrated shown has the customary circular form with horizontal slots in its dial or face plate, 10, for the exhibition of the dials of the trip odometer, 11, and the total odometer, 12, these being of the side by side disk type and dials of the trip odometer having at appropriate points upon their periphery blocks or spots, 13, of different colors which at the expiration of the appointed mileages appear at the display opening and the speedometer having a cylindrical shell or casing, 14, which extends rearwardly through a circular hole in the plate, 15, to which it is attached and by which the instrument is secured to the instrument board of the car. Concentric with and spaced a slight distance from the periphery of the shell or casing is a supplemental cylindrical shell or casing, 16, which may be attached to and extend rearwardly from the supporting plate, 15, and be the means by which the main casing with its enclosed parts is attached to said supporting plate and in the annular space thus provided between the two shells or casings and which opens at the front of the instrument around the face or dial plate are slidably mounted edge to edge the segment form tablets, 17, there being preferably between the edges of adjacent tablets a guide rib, 18, parallel with the axis of the cylindrical shells or casings, to confine the tablets against lateral displacement and to guide them in their sliding movement back and forth to place them in and out of the storage space between the two shells or spacing. Each tablet may have at its front edge a button, 19, to form a knob or handle for moving it back and forth and such knob may be alone colored in correspondence with the appropriate color spot on the odometer dial or the entire front edge of the tablet may be so colored such edge being visible at the front of the instrument when the tablet is pushed back into its storage space. The appropriate textual or explanatory matter may be on the upper or outer faces of those of the tablets which when slid out will expose such faces for ready reading, and upon the upper and inner faces of those which when slid out will have such faces situated for more ready inspection, it being unnecessary with this arrangement to swing the tablets when drawn forward out of the annular storage space to a position that will facilitate reading the textual matter thereon. To prevent the complete withdrawal of the tablets a stop for each to limit the outward movement thereof is preferably provided which may consist of a short round pin, 20, at the front of the annular recess and a hook form lug, 21, at the rear end of the tablet which will engage the pin and permit the tablet to be rocked or swung to a position for better exposing the reading matter thereon as indicated in dotted lines in Fig. 2. If desired one more tablet than the number corresponding with the number of colored spots on the odometer dials can be provided upon which may be placed a diagram of the chassis showing the places where lubricant is to be applied and the knob of such tablet could be white or inscribed with the word "Chart" to identify or designate it.

What I claim is:

1. A device having an odometer with dial markings having reference to requirements of the car which should be attended to on a mileage basis, the odometer having a suitable casing and a tablet containing textual matter explanatory of the dial marking shiftable back and forth in a space adjacent the exterior of the device and which opens at the front thereof.

2. A device having an odometer with dial markings having reference to requirements of the car which should be attended to on a mileage basis, and a plurality of tablets arranged in a circular group around the device and slidable back and forth from the face of the device, said tablets having textual matter explanatory of the dial markings.

3. A speedometer having a cylindrical casing and a face plate with a slot for the display of the odometer dials, a supporting plate to which the speedometer casing is attached having a hole concentric with said casing and the odometer dials having distinctive markings and a circular series of tablets slidably mounted about the speedometer casing and movable back and forth through the hole in said supporting plate, said tablets being provided with textual matter referring to the dial markings of the odometer.

In testimony whereof I hereunto affix my signature.

MARVIN SMITHEY.